(12) United States Patent
Granger et al.

(10) Patent No.: US 7,400,949 B2
(45) Date of Patent: Jul. 15, 2008

(54) DEVICE FOR ADJUSTING AT LEAST ONE PARAMETER, IN PARTICULAR FOR AN AIRCRAFT AUTOMATIC PILOT SYSTEM

(75) Inventors: Stéphane Granger, Toulouse (FR); Thierry Bourret, Toulouse (FR)

(73) Assignee: Airbus France, Toulouse (FR)

( * ) Notice: Subject to any disclaimer, the term of this patent is extended or adjusted under 35 U.S.C. 154(b) by 835 days.

(21) Appl. No.: 10/846,600

(22) Filed: May 17, 2004

(65) Prior Publication Data

US 2004/0236480 A1    Nov. 25, 2004

(30) Foreign Application Priority Data

May 19, 2003   (FR)   .................................. 03 05948

(51) Int. Cl.
*G01C 23/00*   (2006.01)
(52) U.S. Cl. ........................... 701/3; 701/11; 244/17.13
(58) Field of Classification Search ...................... 701/3, 701/4, 11, 29, 31; 714/799, 811, 819, 820; 340/945, 963, 971; 244/76 R, 175, 17.13
See application file for complete search history.

(56) References Cited

U.S. PATENT DOCUMENTS

| | | | | |
|---|---|---|---|---|
| 4,368,618 | A | * | 1/1983 | Nave ........................ 60/39.281 |
| 4,517,161 | A | * | 5/1985 | Gravina et al. ................ 422/95 |
| 4,549,260 | A | | 10/1985 | Saito et al. |
| 5,534,929 | A | * | 7/1996 | Tanaka .................. 375/240.03 |
| 5,602,333 | A | * | 2/1997 | Larrabee et al. ............... 73/149 |
| 5,621,666 | A | | 4/1997 | O'Neall et al. |
| 5,663,732 | A | * | 9/1997 | Stangeland et al. .... 342/357.06 |
| 5,920,170 | A | | 7/1999 | Seki et al. |
| 5,927,655 | A | * | 7/1999 | Larramendy et al. ........ 244/195 |
| 6,122,572 | A | * | 9/2000 | Yavnai ........................ 701/23 |
| 6,227,492 | B1 | * | 5/2001 | Schellhase et al. ...... 244/134 D |
| 6,446,911 | B1 | * | 9/2002 | Yount et al. ................. 244/195 |
| 6,526,337 | B2 | * | 2/2003 | Gardner ......................... 701/3 |
| 7,103,460 | B1 | * | 9/2006 | Breed .......................... 701/29 |
| 2004/0236480 | A1 | * | 11/2004 | Granger et al. ................. 701/3 |

(Continued)

FOREIGN PATENT DOCUMENTS

EP          0416258          3/1991

(Continued)

OTHER PUBLICATIONS

Beam: technology for autonomous self-analysis; Mackey, R.; James, M.; Han Park; Zak, M.; Aerospace Conference, 2001, IEEE Proceedings; vol. 6, Mar. 10-17, 2001 pp. 2989-3001 vol. 6; Digital Object Identifier 10.1109/AERO.2001.931319.*

(Continued)

*Primary Examiner*—Cuong H Nguyen
(74) *Attorney, Agent, or Firm*—Dickinson Wright, PLLC

(57) ABSTRACT

A device for adjusting a parameter includes a selector that is actuated by an operator. A coder is driven in rotation by the actuation of the selector and emits a signal representative of the rotation. A first detector detects an actuation of the selector, and a second detector detects the emission of the signal indicating the change of the selected value. A comparitor, linked to the first and second detectors, determines a malfunction when only one of the first and second detectors makes a detection.

15 Claims, 4 Drawing Sheets

U.S. PATENT DOCUMENTS

2005/0027406 A1* 2/2005 Nonami et al. .................. 701/3

FOREIGN PATENT DOCUMENTS

JP 04216344 A * 8/1992
JP 2000078281 A * 3/2000

OTHER PUBLICATIONS

Intelligent fault diagnosis and control reconfiguration; Rauch, H.E.; Control Systems Magazine, IEEE vol. 14, Issue 3, Jun. 1994 pp. 6-12; Digital Object Identifier 10.1109/37.291462.*

Fault-tolerance: The survival attribute of digital systems; Avizienis, A.; Proceedings of the IEEE vol. 66, Issue 10, Oct. 1978 pp. 1109-1125.*

One of the methods of observing ESD around electronic equipments; Takai, T.; Kaneko, M.; Honda, M.; Electrical Overstress/Electrostatic Discharge Symposium, 1996. Proceedings; Sep. 10-12, 1996 pp. 186-192.*

Preliminary Search Report dated Feb. 5, 2004 with English translation.

* cited by examiner

DEVICE FOR ADJUSTING AT LEAST ONE PARAMETER, IN PARTICULAR FOR AN AIRCRAFT AUTOMATIC PILOT SYSTEM

FIELD OF THE INVENTION

The present invention relates to a device for adjusting at least one parameter.

Although not exclusively, the present invention applies more particularly to the adjustment of parameters on an aircraft automatic pilot system, in particular of a civil transport airplane.

BACKGROUND OF THE RELATED ART

It is known that aircraft are furnished with a customary automatic pilot system, comprising a manual control module of said system, this module usually being of the FCU (Flight Control Unit) type. Such a module comprises an adjustment device which allows the adjustment of a certain number of parameters, in particular the altitude of the aircraft, its speed (or its Mach number), its heading (or its flight path), its vertical speed (or its angle of descent), etc.

It is also known that such an adjustment device usually comprises, for the adjustment of a parameter:
- at least one selector which is capable of being actuated by an operator;
- at least one coder which is driven in rotation by said selector, when the latter is actuated, and which then emits a signal representative of that rotation; and
- at least one arithmetic unit which receives the signal emitted by the coder, formats it, makes a computation to deduce the selected value therefrom and is capable of transmitting the selected value thus computed. This selected value is made available to the items of equipment that use it (such as the automatic pilot system in particular), for example by means of an "ARINC 429" type link. It is also communicated, for example, by means of a serial link inside the FCU module, to a display module situated on the front face of the latter.

In exceptional cases, corresponding for example to an operation of the FCU module in environmental conditions of extreme interference from an electromagnetic point of view or in cases of malfunction, even though extremely brief, of the coder or of a component of one of the portions of the adjustment device of said FCU module, the risk cannot be totally excluded that the value of one of the parameters, selected by a pilot, is modified without there having been an action of said pilot on the selector with the intention of modifying it. Such behavior could be disorientating for the pilot, since the flight of the aircraft would then no longer correspond to the parameters selected by said pilot.

SUMMARY OF THE INVENTION

The object of the present invention is to remedy these drawbacks. It concerns an adjustment device, which allows any malfunction of the abovementioned type to be detected in a simple and low cost manner.

To this end, according to the invention, said device of the type comprising for the adjustment of a parameter:
- at least one selector which is capable of being actuated by an operator;
- at least one coder which is driven in rotation by said selector when the latter is actuated, and which then emits a signal representative of that rotation; and
- at least one arithmetic unit which receives the signal emitted by the coder, formats it, makes a computation to deduce the selected value therefrom and is capable of transmitting the selected value thus computed, is remarkable in that it also comprises:
- a first detection means which is capable of detecting an actuation of said selector;
- a second detection means which is capable of detecting the emission of a signal indicating a change of the selected value; and
- a comparison means which is linked to said first and second detection means and which deduces a malfunction from the information received from said first and second detection means when only one of said first and second detection means has made a detection.

Thus, thanks to the invention, a malfunction (in the adjustment of the parameter, that is in the selection of the value) is detected when the information originating from said first and second selection means is contradictory, that is when one and not the other has detected a change of the selected value.

Preferably however, said comparison means deduces a malfunction only when said second detection means has detected a change of the selected value while said first detection means has not detected actuation of said selector.

It will be noted that said adjustment device perfected according to the present invention is simple and low cost.

In a particular embodiment, said adjustment device also comprises:
- a first means which prevents the arithmetic unit from transmitting a change of the selected value, on detection of a malfunction by said comparison means. Thus, in the event of a malfunction, a user device, such as an automatic pilot system, or a display means intended to display the selected values, does not register the value changed in an undesired manner by this malfunction (and therefore not controlled by the operator); and
- a second means which emits an alarm signal, for example a visual signal, an audible signal or a tactile signal, on detection of a malfunction by said comparison means.

In a preferred embodiment, said first detection means comprises an auxiliary coder which is mounted in series between said selector and said coder. As said auxiliary coder is independent of said coder, it has the advantage of being independent of a failure of the latter.

In addition, advantageously, said second detection means comprises an electronic circuit board which receives the information emitted at the output of said arithmetic unit.

Furthermore, in a particular embodiment, the adjustment device according to the invention also comprises a third means, for example a flight management computer of the "FMGC" (Flight Management and Guidance Computer) type, which is capable of sending an order to change the selected value directly to said arithmetic unit, and said first detection means is capable of detecting such an order and of indicating such a detection to said comparison means.

Furthermore, in another advantageous embodiment, said arithmetic unit comprises a first computer which receives the signal emitted by the coder and which formats it, and a second computer which receives the signal formatted by said first computer, which makes a computation to deduce the selected value therefrom and which is capable of transmitting the selected value thus computed, and said second detection means is capable of detecting the signal which is formatted by said first computer and which is transmitted by the latter to said second computer.

In this case, advantageously, said second detection means and said comparison means are integrated into said second computer.

In addition, in this final advantageous embodiment, the adjustment device according to the invention also comprises a fourth means which prevents said second computer from registering information transmitted by said first computer, relating to a change of the selected value, when said comparison means has detected a malfunction. Preferably, this fourth means is also integrated into said second computer.

In addition, advantageously, the link between said first detection means and said comparison means passes through said first computer and is furnished with a discrete signal processing unit, that is to say a unit which processes the information transmitted via the link as a discrete signal, and which is independent of the software functions of said first computer.

Furthermore, in another embodiment, in which said arithmetic unit comprises first and second redundant computing channels, said adjustment device according to the invention comprises a first set formed of a second selection means and of a comparison means, which is associated with said first computing channel, a second set formed of a second selection means and of a comparison means, which is associated with said second computing channel, and a means of priority to register in prioritized manner, when only one of said comparison means has detected a malfunction, the information originating from the computing channel, the associated comparison means of which has not detected a malfunction.

The present invention also relates to an aircraft automatic pilot system, comprising a functional unit which is disposed in a control module furnished with a system of adjusting parameters that are used by said functional unit.

According to the invention, this automatic pilot system is remarkable in that said system of adjusting parameters comprises at least one adjustment device such as that specified above.

BRIEF DESCRIPTION OF THE DRAWINGS

The figures in the appended drawing will clearly explain how the invention can be implemented. In these figures, the same reference numbers denote similar elements.

DETAILED DESCRIPTION OF THE INVENTION

The adjustment device 1 according to the invention is intended to adjust at least one parameter, in particular a parameter of an aircraft, such as the altitude, the speed or the heading for example, as will be seen in greater detail below.

Figure 1:
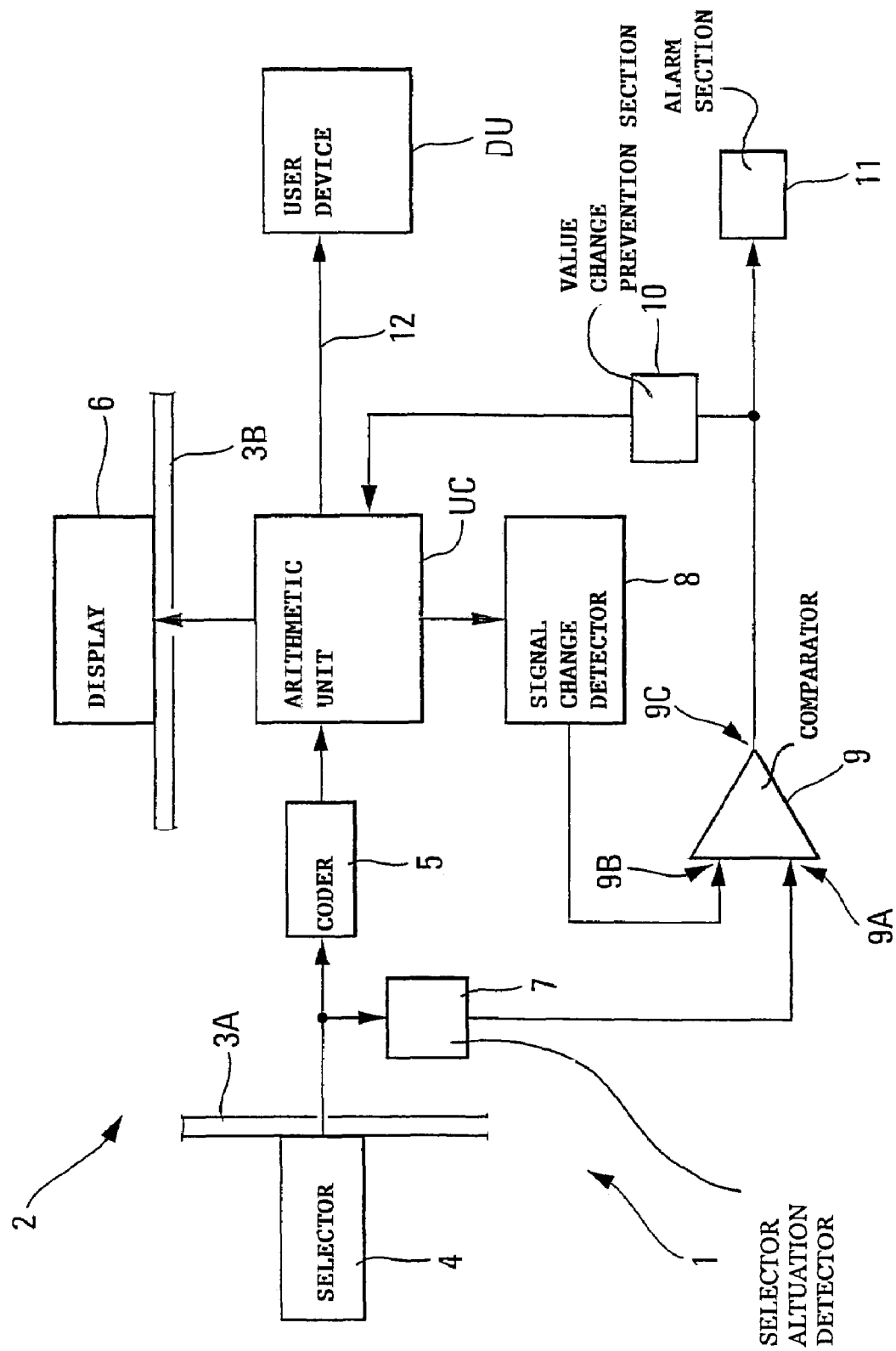
FIGS. 1 to 5 are block diagrams of various embodiments of an adjustment device according to the invention.

Accordingly, said adjustment device 1 is furnished with a module, of which only two portions of wall 3A and 3B have been shown in FIG. 1 for reasons of simplifying the drawing, and comprises, for the parameter adjustment, an adjustment set 2 comprising:

a selector 4, for example a rotary knob, that is disposed on one external face of the module 3A, and that is capable of being actuated by an operator when he wants to change the value of the parameter in question;

a coder 5, in particular a thumbwheel, which is driven in rotation by said selector 4, when the latter is actuated by an operator and which then emits a signal representative of that rotation (and therefore of the selection made by said operator); and an arithmetic unit UC which receives the signal emitted by the coder 5, formats it, makes a computation to deduce the selected value therefrom and is capable of transmitting the selected value thus computed.

This selected value is placed at the disposal of a user device DU, such as an automatic pilot system, for example by means of a link 12 of the "ARINC 429" type. It is also sent, for example by means of a serial link inside the module, to a customary display means 6, which is disposed on an external face 3B of said module and which displays the selected value.

According to the invention, said adjustment set 2 of the adjustment device 1 also comprises:

a detection means 7 which is capable of detecting an actuation of said selector 4;

a detection means 8 which is capable of detecting the emission of a signal indicating a change of the selected value; and a comparison means 9 which is linked to said detection means 7 and 8 and which deduces a malfunction from the information received at its inputs 9A and 9B from said detection means 7 and 8 (available at its output 9C) when only one of said detection means 7 and 8 has made a detection.

In a preferred embodiment, said comparison means 9 deduces a malfunction when said detection means 8 has detected a change of the selected value while said detection means 7 has not detected actuation of said selector 4, that is to say when the arithmetic unit UC changes the selected value without an operator having ordered such a change by means of the selector 4.

In a particular embodiment, said adjustment device 1 also comprises:

a means 10 which prevents the arithmetic unit UC from transmitting a change of the selected value, on detection of a malfunction by said comparison means 9. Thus, in the event of a malfunction, a user device DU, such as an aircraft automatic pilot system, or a display means 6 intended to display the selected values, does not register the value changed in an undesired way by this malfunction; and a customary means 11, which emits an alarm signal, for example a visual, audible or tactile signal on detection of a malfunction by said comparison means 9.

In a preferred embodiment, said detection means 7 comprises an auxiliary coder which is mounted in series between said selector 4 and said coder 5. As said auxiliary coder 7 is then independent of said coder 5, it has the advantage of being independent of a failure of the latter.

Figure 2:
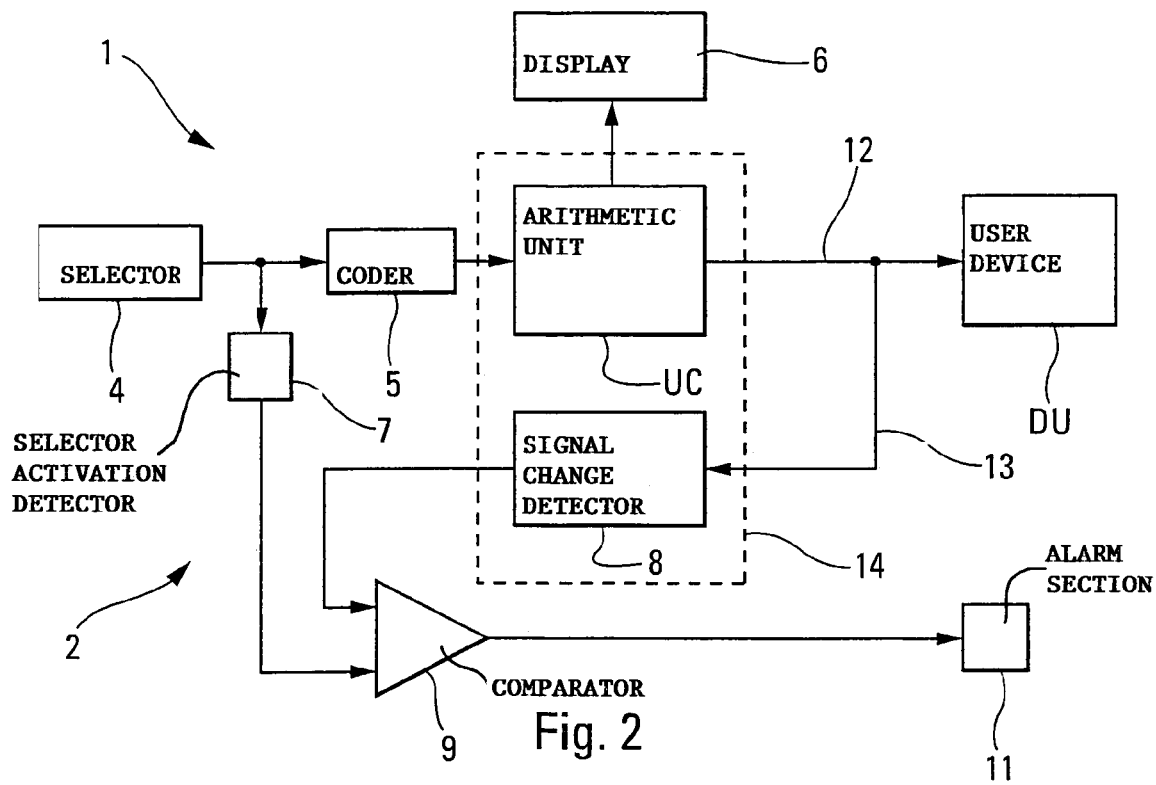

In a particular embodiment shown in FIG. 2, the detection means 8 detects a change of the selected value using information which is transmitted by the arithmetic means UC to a user device DU via the link 12. Accordingly, said detection means 8 is connected via a link 13, for example a link of the "ARINC 429" type to said link 12. Preferably, said detection means 8 is produced in software manner on an electronic circuit board. The embodiment in FIG. 2 illustrates, by a rectangle with dashed lines, the set 14 of software elements of said adjustment device 1 in this case.

Figure 3:
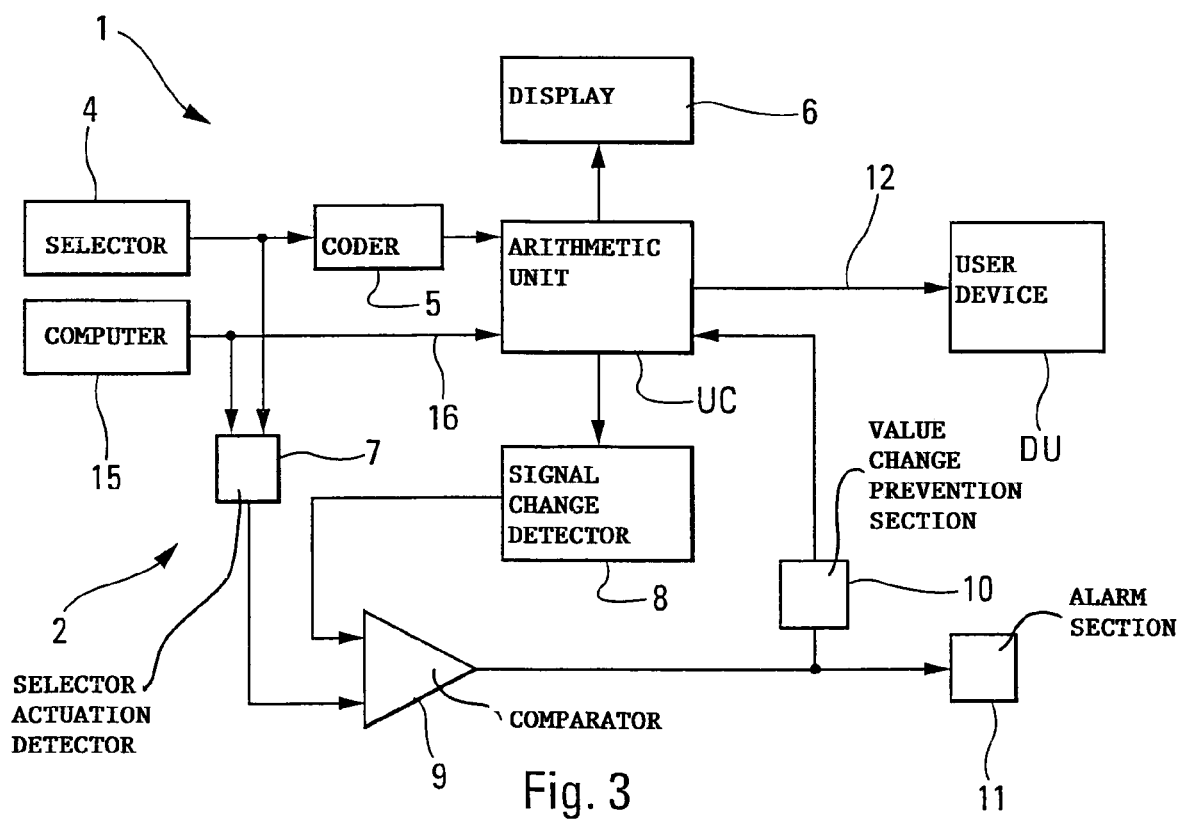

A variant embodiment of the invention, which is shown in FIG. 3 and which is particularly well suited to the selection of parameters of an aircraft, in particular the speed (or Mach), heading (or flight path) or vertical speed (or angle of descent) parameters, concerns the case for which the selected value of the parameter in question may be changed either by an operator (pilot, etc.) by means of said selector 4, or on the order of a computer 15 (such as for example a flight management computer of the "FMGC" (Flight Management and Guidance Computer) type) which is connected to the arithmetic unit UC, for example by means of a link 16 of the "ARINC 429" type.

In this case, said selection means 7 is formed in such a manner as to be able to achieve, in addition to the detection of an action on the selector 4, the detection of an order to modify the selected value, emitted by this computer 15. Such a mode of operation is advantageous, since it means that the alarm is not triggered when a change of the selected value occurs at the request of said computer 15, that is to say without actuation of the selector 4.

Figure 4:
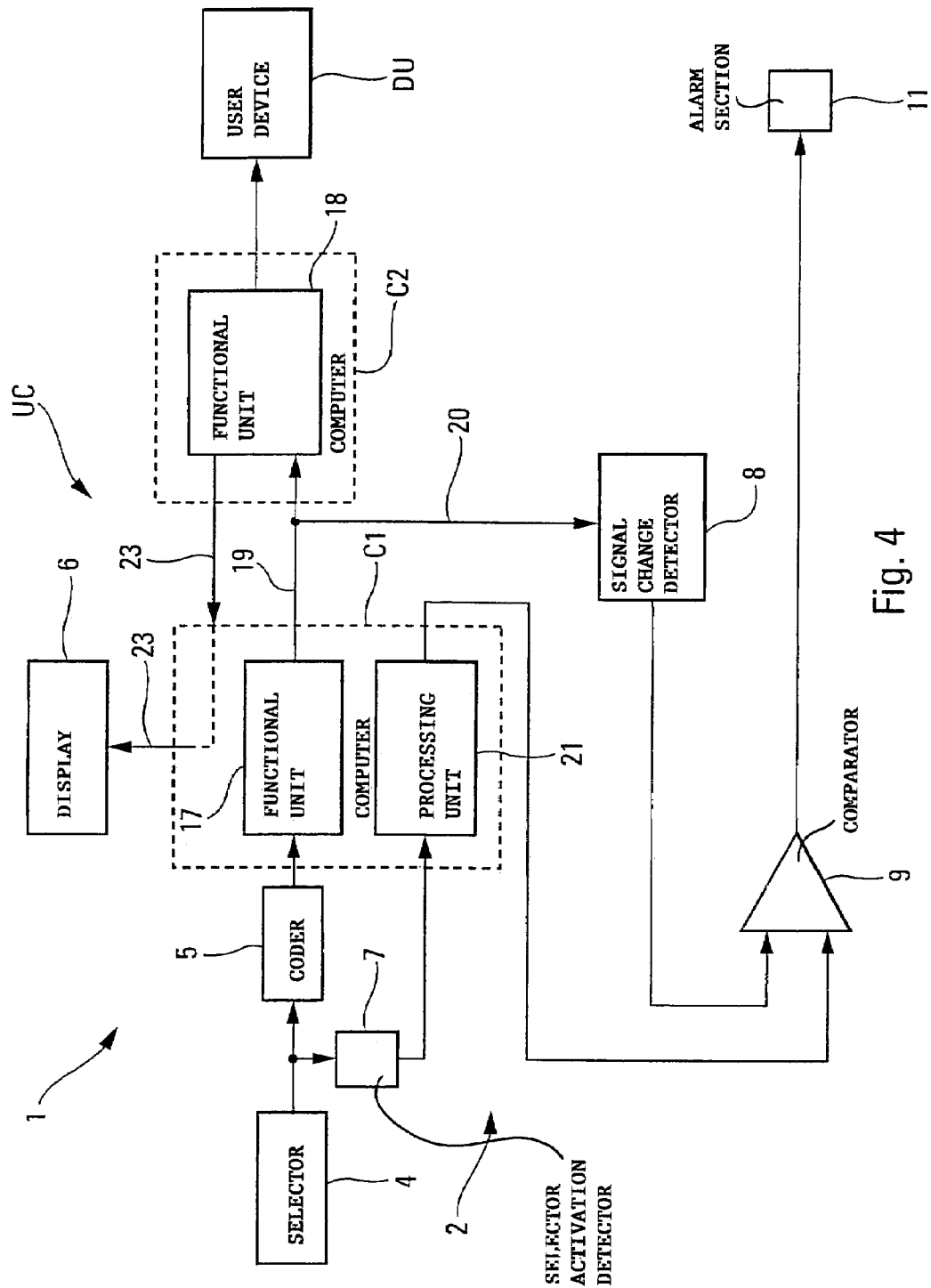

In another embodiment shown in FIG. 4, said arithmetic unit UC comprises a computer C1 which comprises a functional unit 17 (software) intended to receive the signal emitted by the coder 5 and format it, and a computer C2 which comprises a functional unit 18 (software) which is connected via a link 19 (for example a link of the "ARINC 429" type) to the computer C1 and which is intended to receive the signal formatted by said computer C1, to make a computation to deduce the selected value therefrom and to transmit the selected value thus computed.

In this case, according to the invention, said arithmetic means 8 is capable of detecting via a link 20 the signal which is formatted by said computer C1 and which is transmitted by the latter to said computer C2 via the link 19.

Furthermore, it will be noted that the link between the detection means 7 and the comparison means 9 may be direct. However, in a preferred embodiment shown in FIGS. 4 and 5, the link between said detection means 7 and said comparison means 9 passes through said computer C1 and is furnished with a unit 21 which processes the corresponding signal as a discrete signal, which is integrated into said computer C1, but which is independent of the customary software functions (for formatting the signal received from the coder 5, in particular) of the functional unit 17 of said computer C1.

The fact that this link is implemented in such a manner as to register a discrete signal has the advantage of being independent of any software failure (failure of the functional unit 17) of said computer C1.

Figure 5:
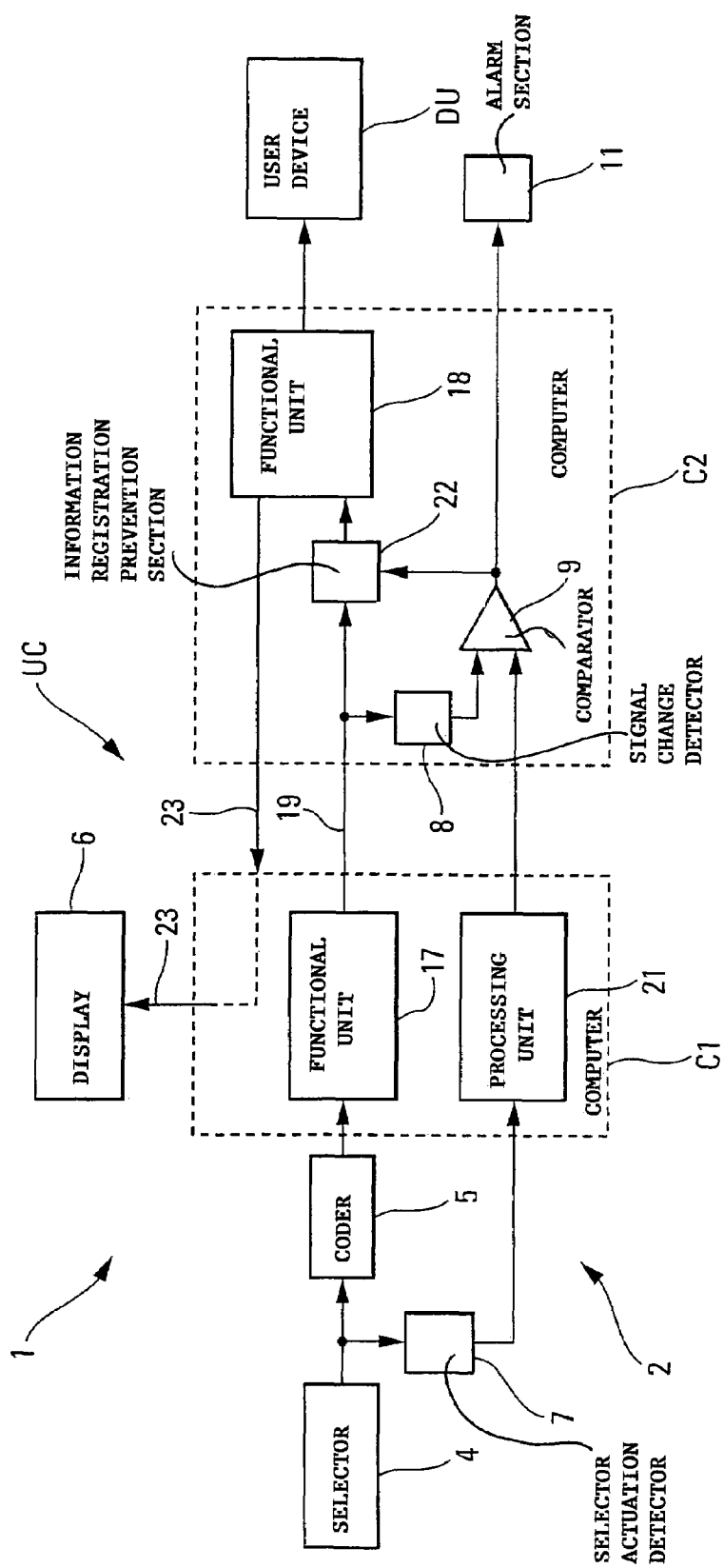

In a particular embodiment shown in FIG. 5, said detection means 8 and said comparison means 9 are integrated into said second computer C2. By reason of its particular architecture, this second computer C2 has the particular feature of having a very high degree of integrity and, consequently, abnormal functioning of the latter is detected and inhibited.

The adjustment device 1 according to this particular embodiment also comprises a means 22 which is integrated into said computer C2 and which prevents this computer C2 from registering information transmitted by said computer C1, relative to the parameter adjustment in question, when said comparison means 9 has detected a malfunction.

Said adjustment device 1 also comprises a link 23 originating from the computer C2 and passing through the computer C1 to control the display means 6.

Furthermore, in a particular embodiment, not shown, said arithmetic unit UC comprises first and second redundant computing channels and said adjustment device 1 comprises:
- a first set which is formed of a selection means 8, and of a comparison means 9 and which is associated with said first computing channel;
- a second set which is formed of a selection means 8 and of a comparison means 9 and which is associated with said computing channel; and
- a means of priority to register in prioritized manner, when only one of said two comparison means 9 has detected a malfunction, the information originating from the computing channel, the associated comparison means 9 of which has not detected a malfunction.

When one of these computing channels has already failed before the detection of a malfunction, the malfunction signal emitted by the comparison means 9 may be used to warn the pilot of the problem that has occurred, so that he can take the appropriate action. In this case, the computing channel which hitherto has not yet failed, may nevertheless remain available so that the pilot can select various other parameters.

Naturally, the adjustment device 1 according to the invention can be used to adjust a plurality of different parameters. It then comprises a plurality of adjustment sets 2, each of which is intended for the adjustment of one particular parameter. In this case, the adjustment device 1 comprises preferably a single arithmetic unit UC which is common to said various adjustment sets 2.

In a preferred application of the adjustment device 1 according to the invention, the user device DU is a functional unit (software) of an aircraft automatic pilot system and the adjustment device 1 is part of an FCU (Flight Control Unit) unit which is intended for the adjustment of a certain number of parameters of the aircraft, such as the altitude, the speed, the heading and/or the slope, which are used by said automatic pilot system.

The invention claimed is:

1. A device for adjusting at least one parameter, the device comprising:
    at least one selector which is capable of being actuated by an operator;
    at least one coder which is driven in rotation by said selector when the latter is actuated, and which then emits a signal representative of that rotation; and
    at least one arithmetic unit which receives the signal emitted by the coder, formats it, makes a computation to deduce the a selected value therefrom and is capable of transmitting the selected value thus computed, wherein it also comprises:
    a first detection means which is capable of detecting an actuation of said selector;
    a second detection means which is capable of detecting the emission of a signal indicating a change of the selected value; and
    a first comparison means which is linked to said first and second detection means and which deduces a first signal change detection malfunction from the information received from said first and second detection means when only one of said first and second detection means has made a detection.

2. The device as claimed in claim 1, wherein said first comparison means deduces said first malfunction only when said second detection means has detected said change of the selected value while said first detection means has not detected actuation of said selector.

3. The device as claimed in claim 1, wherein it also comprises a first means which prevents the arithmetic unit from transmitting said change of the selected value, on detection of said first malfunction by said first comparison means.

4. The device as claimed in claim 1, wherein it also comprises a second means which emits an alarm signal, on detection of said first malfunction by said first comparison means.

5. The device as claimed in claim 1, wherein it also comprises a display means which is intended to display the selected value, transmitted by said arithmetic unit.

6. The device as claimed in claim 1, wherein said first detection means comprises an auxiliary coder which is mounted in series between said selector and said coder.

7. The device as claimed in claim 1, wherein said second detection means comprises an electronic circuit board which receives the information emitted at the output of said arithmetic unit.

8. The device as claimed in claim 1, wherein it also comprises a third means which is capable of sending an order to change the selected value directly to said arithmetic unit and wherein said first detection means is capable of detecting said order and of indicating the detection of said order to said first comparison means.

9. The device as claimed in claim 1, wherein said arithmetic unit comprises a first computer which receives the signal emitted by the coder and which formats it, and a second computer which receives the signal formatted by said first computer, which makes a computation to deduce the selected value therefrom and which is capable of transmitting the selected value thus computed, and wherein said second detection means is capable of detecting the signal which is formatted by said first computer and which is transmitted by the latter to said second computer.

10. The device as claimed in claim 9, wherein said second detection means and said first comparison means are integrated into said second computer.

11. The device as claimed in claim 9, wherein it also comprises a fourth means which prevents said second computer from registering information transmitted by said first computer, relating to said change of the selected value, when said first comparison means has detected said first malfunction.

12. The device as claimed in claim 11, wherein said fourth means is integrated into said second computer.

13. The device as claimed in claim 9, wherein the link between said first detection means and said first comparison means passes through said first computer and is furnished with a discrete signal processing unit, which is independent of the software functions of said first computer.

14. The device as claimed in claim 1, further comprising:
a third detection means for detecting the emission of the signal indicating the change of the selected value;
a second comparison means, linked to the first and third detection means, for deducing a second signal change detection malfunction when only one of the first and third detection means makes a detection; and
a registration priority means, wherein:
the arithmetic unit comprises first and second redundant computing channels,
the second detection means and first comparison means are associated with the first computing channel,
the third detection means and the second comparison means are associated with the second computing channel, and
the registration priority means registers information received from the first computing channel when the second comparison means detects the second malfunction and registers information received from the second computing channel when the first comparison means detects the first malfunction.

15. An aircraft automatic pilot system comprising a control module having a functional unit and the device of claim 1 for adjusting parameters used by the functional unit.

* * * * *